US012602404B2

(12) United States Patent
Nakata et al.

(10) Patent No.: US 12,602,404 B2
(45) Date of Patent: Apr. 14, 2026

(54) DATA LABELING WORK SUPPORT APPARATUS, DATA LABELING WORK SUPPORT METHOD, AND STORAGE MEDIUM

(71) Applicant: KABUSHIKI KAISHA TOSHIBA, Tokyo (JP)

(72) Inventors: Kouta Nakata, Tokyo (JP); Kentaro Takagi, Yokohama Kanagawa (JP); Yaling Tao, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 0 days.

(21) Appl. No.: 18/175,762

(22) Filed: Feb. 28, 2023

(65) Prior Publication Data

US 2024/0086428 A1 Mar. 14, 2024

(30) Foreign Application Priority Data

Sep. 14, 2022 (JP) ................................. 2022-146396

(51) Int. Cl.
*G06F 16/28* (2019.01)

(52) U.S. Cl.
CPC ................................. *G06F 16/287* (2019.01)

(58) Field of Classification Search
CPC ................................................. G06F 16/287
See application file for complete search history.

(56) References Cited

U.S. PATENT DOCUMENTS

| | | | | |
|---|---|---|---|---|
| 6,038,561 | A | * | 3/2000 | Snyder ................... G06F 16/34 |
| | | | | 707/E17.08 |
| 2010/0150448 | A1* | | 6/2010 | Lecerf ................... G06F 18/253 |
| | | | | 382/190 |
| 2017/0185670 | A1* | | 6/2017 | Dua ......................... G06F 16/50 |
| 2019/0205794 | A1* | | 7/2019 | Hsu ......................... G06N 20/20 |
| 2021/0056444 | A1* | | 2/2021 | Shimazu ................ G06N 20/00 |

(Continued)

FOREIGN PATENT DOCUMENTS

| | | | |
|---|---|---|---|
| JP | 2015-60432 | A | 3/2015 |
| JP | 6307822 | B2 | 4/2018 |

(Continued)

OTHER PUBLICATIONS

Yaling Tao et al., "Clustering-friendly Representation Learning via Instance Discrimination and Feature Decorrelation," ICLR 2021, 11 pages and Appendices, 4 pages, arXiv.2106.00131v1 (2021).

(Continued)

*Primary Examiner* — Van H Oberly
(74) *Attorney, Agent, or Firm* — Finnegan, Henderson, Farabow, Garrett & Dunner, LLP

(57) ABSTRACT

According to one embodiment, a data labeling work support apparatus includes a processor including hardware. The processor acquires a first label assigned to data. The processor acquires the data. The processor extracts a feature of the data. The processor groups the data based on a similarity or a distance of the feature. The processor assigns a second label to the grouped data. The processor calculates a degree of matching between the first label and the second label. The processor outputs information regarding a combination of the first label and the second label having a low degree of matching.

7 Claims, 12 Drawing Sheets

(56)        References Cited

U.S. PATENT DOCUMENTS

| | | | |
|---|---|---|---|
| 2021/0248426 A1 | 8/2021 | Tao et al. | |
| 2023/0325294 A1* | 10/2023 | Muthukrishnan ... | G06F 16/1734 |
| | | | 709/224 |

FOREIGN PATENT DOCUMENTS

| | | |
|---|---|---|
| JP | 2019-164687 A | 9/2019 |
| JP | 2021-128474 A | 9/2021 |
| WO | WO 2020/054551 A1 | 3/2020 |

OTHER PUBLICATIONS

Japan Patent Office, Office Action in JP App. No. 2022-146396 (Dec. 2, 2025).

* cited by examiner

1

| Image | AI label | Manual label |
|-------|----------|--------------|
| 1 | 3 | A |
| 2 | 3 | A |
| 3 | 2 | C |
| 4 | 2 | B |
| ... | ... | ... |
| N | 1 | A |

| AI label | Manual label | Degree of matching |
|---|---|---|
| 3 | C | 1/10=0.1 |
| 3 | B | 1/10=0.1 |
| 2 | A | 1/8=0.125 |
| 2 | B | 1/8=0.125 |
| ... | ... | ... |
| 1 | A | 2/8=0.25 |
F I G. 3
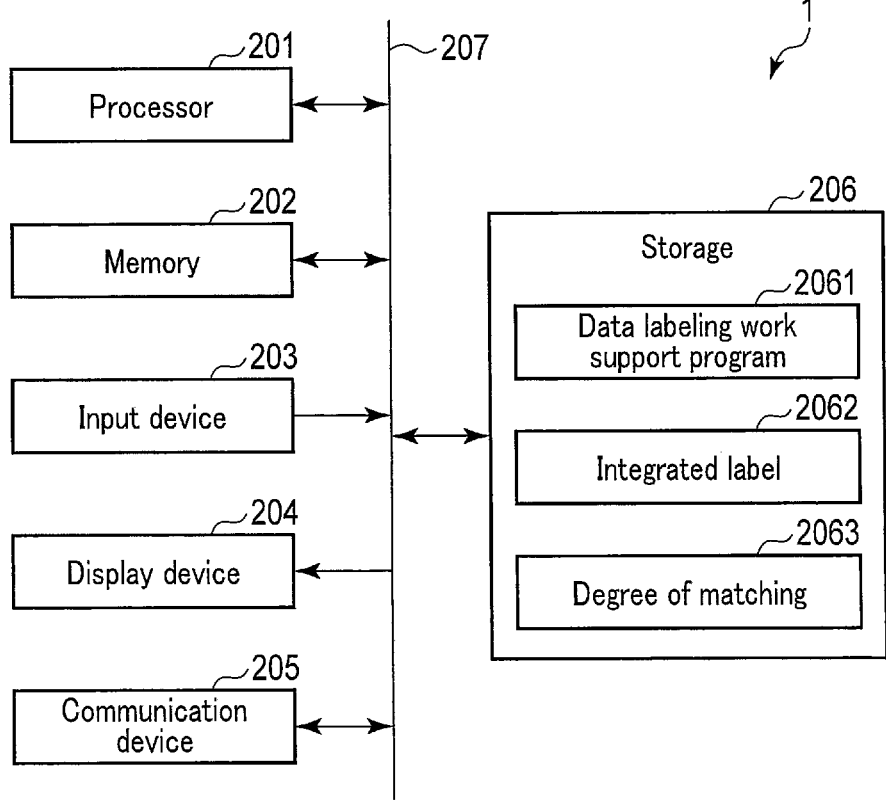
F I G. 4

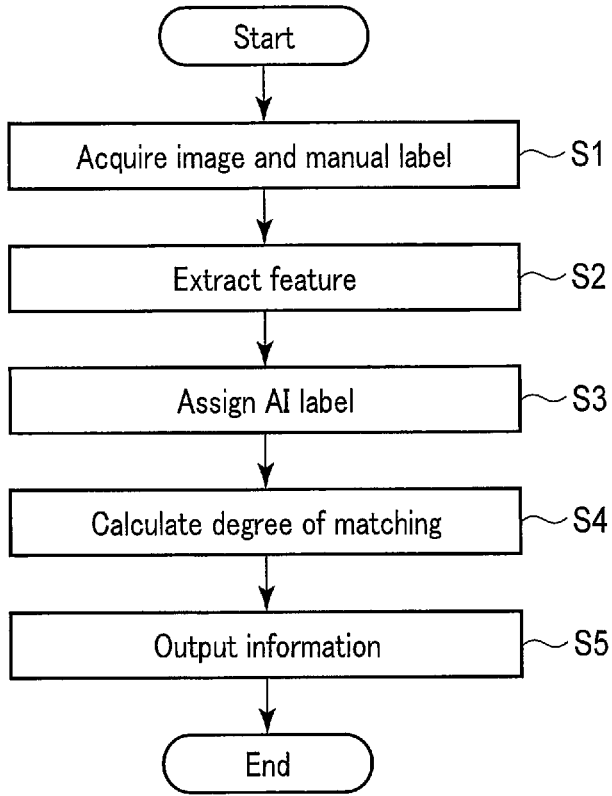
F I G. 5

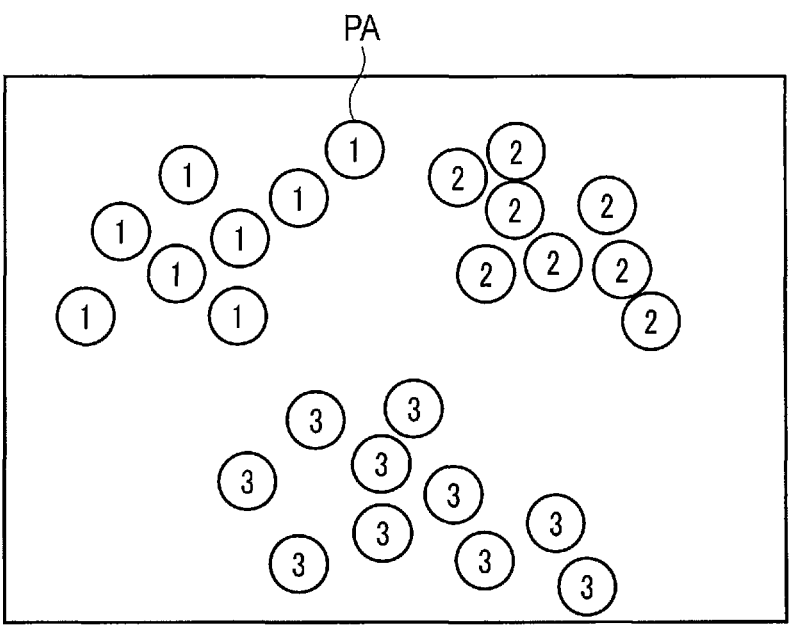
F I G. 6A
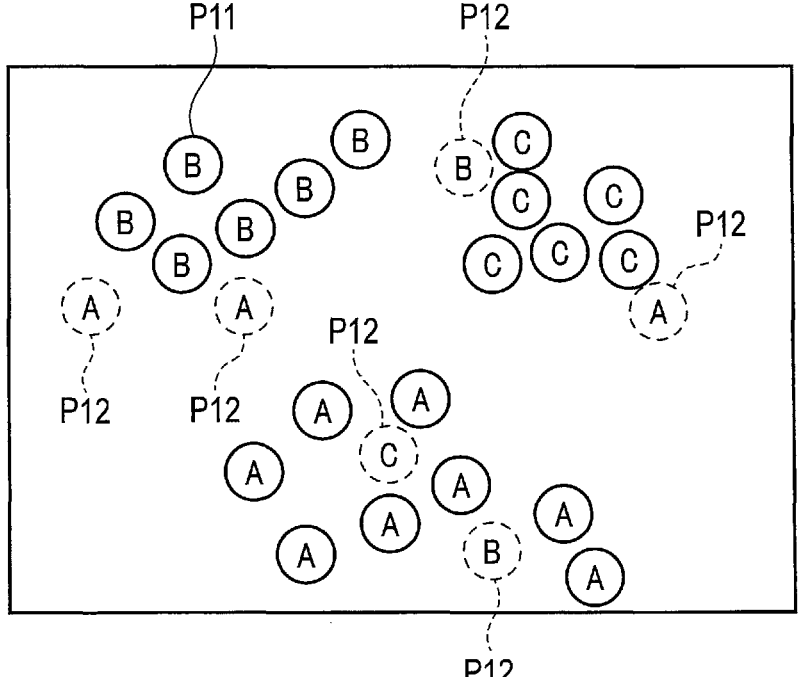
F I G. 6B

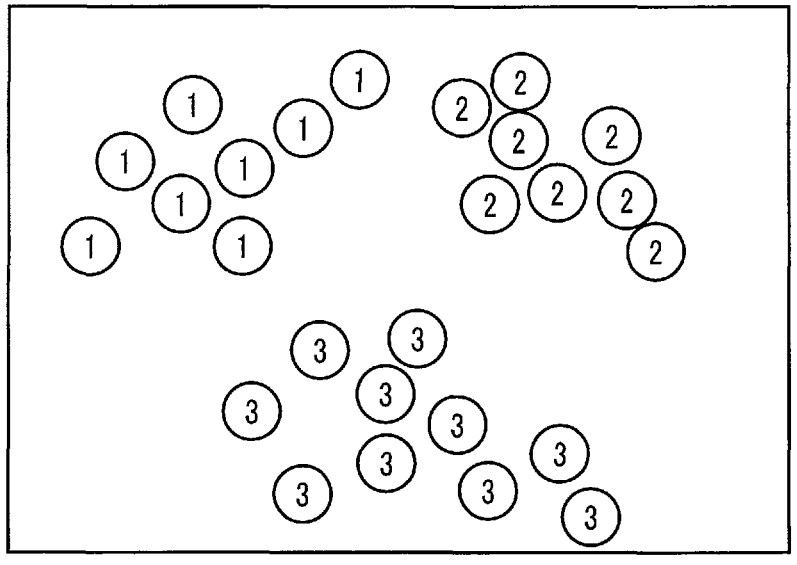
F I G. 7A
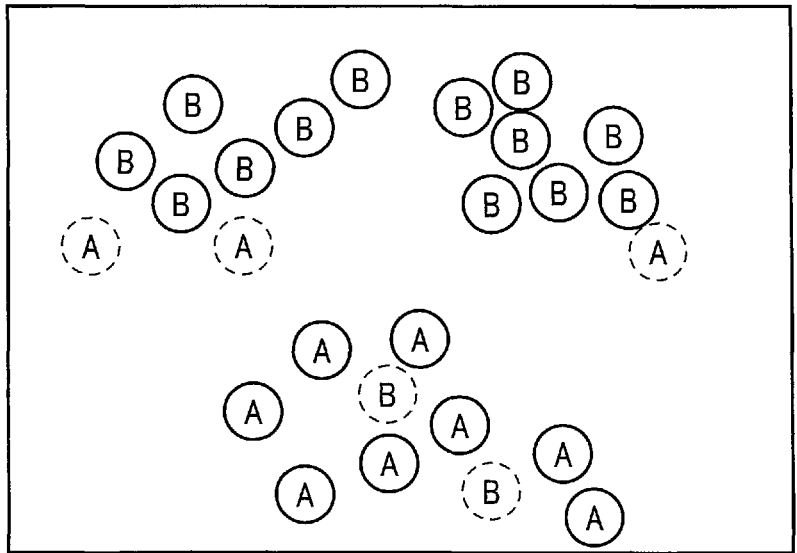
F I G. 7B

| Temporary AI label | Manual label | Degree of matching |
|---|---|---|
| 4 | C | 1/11=0.09 |
| 4 | A | 3/11=0.27 |
| 4 | B | 7/11=0.64 |
F I G. 9C
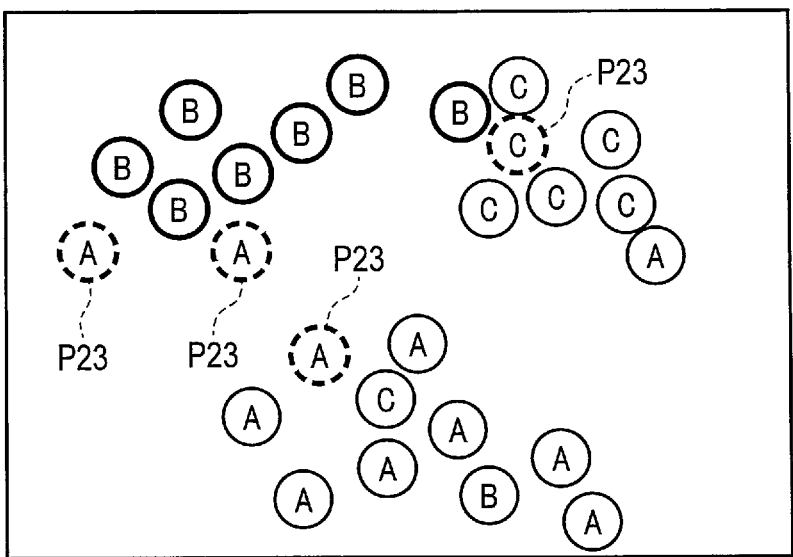
F I G. 9D

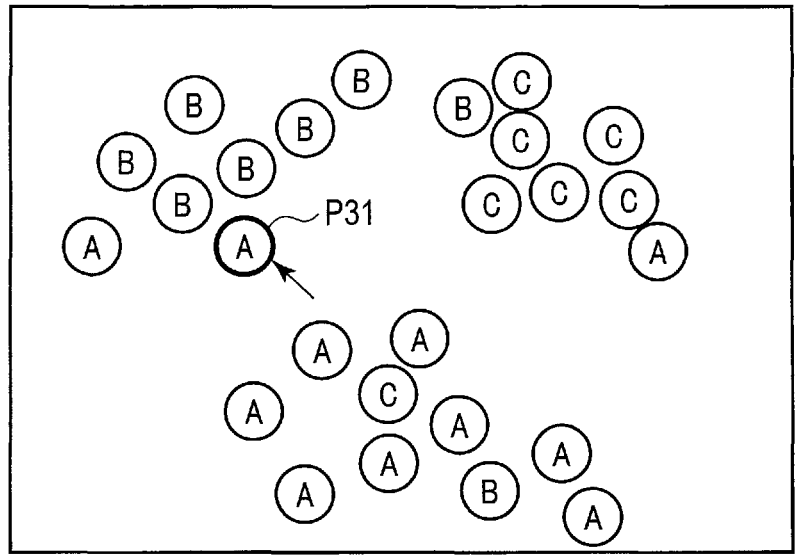
F I G. 10A
| Image | AI label | Manual label |
|-------|----------|--------------|
| 1 | 1 | A |
| 2 | 1 | A |
| ... | ... | ... |
F I G. 10B

| Image | AI label | Manual label (operator 1) | Manual label (operator 2) | Manual label (combined) |
|---|---|---|---|---|
| 1 | 3 | A | A | A_A |
| 2 | 3 | A | B | A_B |
| 3 | 2 | C | C | C_C |
| 4 | 3 | A | A | A_A |
| ⋮ | ⋮ | ⋮ | ⋮ | ⋮ |
| N | 1 | B | B | B_B |

F I G. 11

| AI label | Manual label (combined) | Agreement rate | Degree of matching |
|----------|-------------------------|----------------|--------------------|
| 3 | A_B | 1/2 | 1/10=0.1 |
| 3 | B_B | 2/2 | 1/10=0.1 |
| 3 | A_C | 1/2 | 1/10=0.1 |
| 3 | C_A | 1/2 | 1/10=0.1 |
| ... | ... | ... | ... |

F I G. 12

DATA LABELING WORK SUPPORT APPARATUS, DATA LABELING WORK SUPPORT METHOD, AND STORAGE MEDIUM

CROSS-REFERENCE TO RELATED APPLICATIONS

This application is based upon and claims the benefit of priority from the Japanese Patent Application No. 2022-146396, filed Sep. 14, 2022, the entire contents of which are incorporated herein by reference.

FIELD

Embodiments described herein relate generally to a data labeling work support apparatus, a data labeling work support method, and a storage medium.

BACKGROUND

In the manufacturing field, efforts to monitor the occurrence of defects and shortcomings of products and improve the productivity by classifying images of the product appearance using a machine learning method are being made. Examples of such a machine learning method for a classification model for an image of a product appearance include supervised learning in which a classification model is generated by learning, through a method such as deep learning, an image of a product appearance to which a label serving as a classification criterion is manually assigned in advance. In order to generate a highly accurate classification model in the supervised learning, it is necessary to accurately label a large amount of images. Therefore, the work cost to label in the supervised learning tends to be large. A technique for supporting labeling in such supervised learning is also known.

In a case where a label is manually assigned, determination of operators who actually assign the label may vary. Due to the variations in determination, there may be a case where inconsistent labels are assigned to similar images, that is, a label indicating a defect is assigned to an image while a label indicating no defect is assigned to another image. Here, it is conceivable to provide an administrator for labeling in order to ensure the quality of labels. While the quality of labels is maintained by providing such an administrator for labeling, it is difficult for the administrator to check labels assigned to a large number of images.

BRIEF DESCRIPTION OF THE DRAWINGS

FIG. 3 is a diagram illustrating an example of a degree of matching.

FIG. 4 is a diagram illustrating an example of the hardware configuration of a data labeling work support apparatus.

FIG. 5 is a flowchart depicting an operation of a data labeling work support apparatus.

FIG. 6A is a diagram illustrating an example of a display screen for plot points with AI labels displayed based on two-dimensional plot features as an output screen for information regarding label inconsistency.

FIG. 6B is a diagram illustrating an example of a display screen for plot points with manual labels displayed based on two-dimensional plot features as an output screen for information regarding label inconsistency.

FIG. 7A is a diagram illustrating an example of a display screen for plot points with AI labels displayed two-dimensionally in a first modification.

FIG. 7B is a diagram illustrating an example of a display screen for plot points with manual labels displayed two-dimensionally in the first modification.

FIG. 9C is a diagram illustrating an example of a degree of matching between a temporary AI label and a manual label.

FIG. 9D is a diagram illustrating an example of highlighting plot points corresponding to images having a low degree of matching with respect to a temporary AI label.

FIG. 10A is a diagram illustrating an example of a display screen for plot points with manual labels in a third modification.

FIG. 10B is a diagram illustrating an example of listed images.

FIG. 11 is a diagram illustrating an example of a combined manual label.

FIG. 12 is a diagram illustrating an example of a degree of matching.

DETAILED DESCRIPTION

In general, according to one embodiment, a data labeling work support apparatus includes a processor including hardware. The processor acquires a first label assigned to data. The processor acquires the data. The processor extracts a feature of the data. The processor groups the data based on a similarity or a distance of the feature. The processor assigns a second label to the grouped data. The processor calculates a degree of matching between the first label and the second label. The processor outputs information regarding a combination of the first label and the second label having a low degree of matching.

Figures 1, 2:
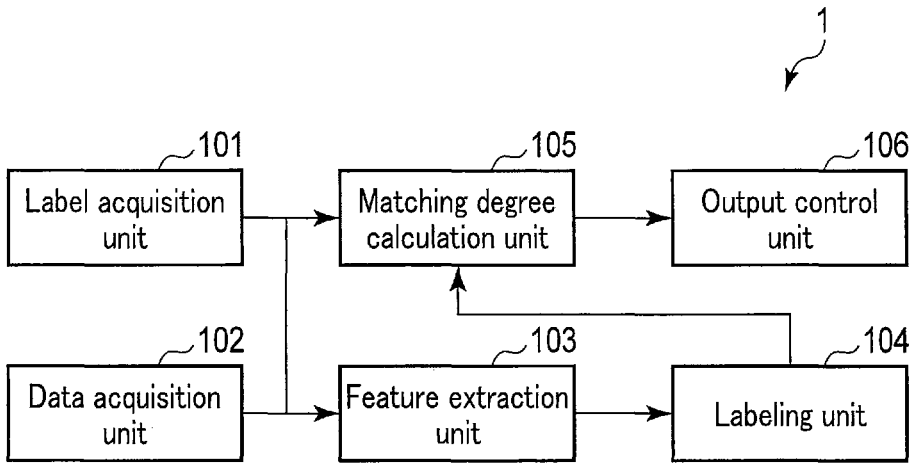
FIG. 1 is a block diagram illustrating the overall configuration of a data labeling work support apparatus according to an embodiment.
FIG. 2 is a diagram illustrating an example of an integrated label as a result of integration of an AI label and a manual label.

Hereinafter, embodiments of the present invention are described with reference to the drawings. FIG. 1 is a block diagram illustrating the overall configuration of a data labeling work support apparatus according to an embodiment. The data labeling work support apparatus of the embodiment supports data labeling work of labeling training data used for machine learning. In particular, the data labeling work support apparatus of the embodiment supports a user to check a label assigned by the data labeling work. The user is, for example, an administrator for labeling. On the other hand, the user is not necessarily limited to the administrator for labeling, and may be an operator who assigns a label. Further, hereinafter, the training data is assumed to be an image. However, the training data may be any data used for machine learning. For example, the training data may be voice, document, or the like.

A data labeling work support apparatus 1 according to the embodiment includes a label acquisition unit 101, a data acquisition unit 102, a feature extraction unit 103, a labeling unit 104, a matching degree calculation unit 105, and an output control unit 106.

The label acquisition unit 101 acquires a label assigned to an image. The label acquisition unit 101 may collectively acquire labels assigned to a plurality of images. In addition, the label assigned by the label acquisition unit 101 may be a label assigned by any method. For example, the label may be a label manually assigned, or may be a label assigned using a classification model that has been trained by a machine learning method. The classification model is a machine learning model that classifies images based on features of the images and assigns labels according to the classified images. The classification model may be trained by supervised learning or unsupervised learning. In the following description, a label acquired by the label acquisition unit 101 is assumed to be a manual label that is manually assigned by an operator. Further, for the following description, it is assumed that a manual label assigned to the i-th image by an operator j is denoted by $y_{ij}$. Here, "j" is an integer from 1 to M. Further, "i" is an integer from 1 to N. Stated differently, in the embodiment, M operators can assign manual labels to N images. Further, the value of the manual label $y_{ij}$ represents a type of the label assigned to an image.

The data acquisition unit 102 acquires actual data on the i-th image to which a label acquired by the label acquisition unit 101 is assigned. For example, the image is an image of a product appearance obtained by, for example, a product inspection apparatus. The resolution of the image may be any resolution such as 128 pixels×128 pixels, for example. The data acquisition unit 102 may acquire an image data set having data on a plurality of images arranged.

The feature extraction unit 103 extracts a feature having a dimension lower than that of a feature of the original image from the actual data on the image acquired by the data acquisition unit 102. The low-dimensional feature can be extracted by, for example, a representation learning method without labels using a deep neural network as proposed in "Clustering Friendly representation learning via instance discrimination and feature decorrelation, Yaling Tao, Kentaro Takagi, Kouta Nakata. arXiv: 2106.00131 (ICLR 2021)". For the following description, it is assumed that a feature extracted from the actual data on the i-th image is represented by $X_i=(x_{i1}, x_{i2}, \ldots, x_{ik})$. Here, k is the number of dimensions of a feature extracted by the feature extraction unit 103. For example, in a case where the feature extraction unit 103 is configured to extract a 64-dimensional feature from actual data on an image, k=64 is satisfied.

The labeling unit 104 groups images using a feature $X_i$ extracted by the feature extraction unit 103. The labeling unit 104 then labels the images of each group. The labeling unit 104 groups the images by using a similarity between the features $X_i$ of the individual images or a distance between the features $X_i$ of the individual images. As the grouping, grouping using various unsupervised learning methods such as clustering can be used. As the clustering, for example, a k-means method can be used. For the following description, a label assigned to an image by the labeling unit 104 is referred to as an AI label. Further, it is assumed that an AI label assigned to the i-th image is denoted by $y_{iA}$. As a value of the AI label $y_{iA}$, for example, a cluster number by the k-means method can be used. Further, the number L' of groups grouped by the k-means method may be the same as the number L of types of labels assigned as the manual labels. As described below, L' may be greater than L.

The matching degree calculation unit 105 generates an integrated label in which an AI label and a manual label are integrated with each other, and calculates a degree of matching between the AI label and the manual label based on the integrated label, thereby extracting information regarding label inconsistency.

FIG. 2 is a diagram illustrating an example of an integrated label as a result of integration of an AI label and a manual label. In FIG. 2, integration is performed by associating an AI label and a manual label assigned to the i-th image. Here, in FIG. 2, the AI label is any one of labels 1, 2, and 3 corresponding to the cluster number. On the other hand, the manual label is any one of labels A, B, and C. As illustrated in FIG. 2, the AI labels and the manual labels do not need to be assigned in the same format.

Further, a degree of matching between the AI label $y_{iA}$ and the manual label $y_{ij}$ assigned by the operator j can be calculated, for example, according to Formula (1).

$$r(l, l') = \frac{\sum_{i=1}^{N} I(y_{iA} = l', y_{ij} = l)}{\sum_{i=1}^{N} I(y_{iA} = l')} \tag{1}$$

Here, a degree of matching r (l, l') of Formula (1) is a degree of matching with respect to the AI label $y_{iA}=l'$ of the manual label $y_{ij}=l$. The denominator of Formula (1) represents the total number of images to which the AI label $y_{iA}=l'$ is assigned among the N images. The I ($y_{iA}=l'$) in denominator of Formula (1) is an indicator function that becomes 1 in a case where $y_{iA}=l'$ is satisfied and becomes 0 in a case where $y_{iA}=l'$ is not satisfied. Further, the numerator of Formula (1) represents the total number of images to which the AI label $y_{iA}=l'$ is assigned and the manual label $y_{ij}=l$ is assigned among the N images. The I ($y_{iA}=l'$, $y_{ij}=l$) in numerator of Formula (1) is an indicator function that becomes 1 in a case where $y_{iA}=l'$ and $y_{ij}=l$ are satisfied and becomes 0 in a case where $y_{iA}=l'$ is not satisfied or $y_{ij}=l$ is not satisfied. Therefore, for example, in a case where the number of images to which the AI label $y_{iA}=3$ is assigned is 10 and the number of images to which the manual label $y_{ij}=C$ is assigned is 1, the degree of matching r(C, 3) is r(C,3)=$\frac{1}{10}$=0.1. Here, the degree of matching does not necessarily need to be calculated according to Formula (1).

FIG. 3 is a diagram illustrating an example of a degree of matching. In FIG. 3, combinations of the AI labels and the manual labels are sorted in ascending order of the degree of matching. In a case where the number of types of the manual labels is L and the number of groups of the AI labels is L', there may be L'×L combinations of the AI labels and the manual labels. However, a degree of matching of a combination that does not exist as a result of assignment does not need to be calculated. On the other hand, the degree of matching of the combination that does not exist as a result of assignment may be calculated as 0, for example.

The output control unit 106 outputs information regarding label inconsistency to be presented to the user based on the degree of matching. The information regarding label inconsistency is information regarding a combination of an AI label and a manual label having a low degree of matching. The combination of an AI label and a manual label having a low degree of matching means that different evaluations are made by the labeling unit 104 and the operator. In this case, the operator may assign different labels to similar images. In the embodiment, such a state in which different evaluations are made by the labeling unit 104 and the operator is a state in which there is a possibility of label inconsistency. For example, if the number of the image with a low degree of matching is displayed in the form of a list, the user can know a candidate for an image for which label inconsistency should be checked. Here, the information regarding label inconsistency can be output, for example, by displaying the information regarding label inconsistency on a display device. In addition, the information regarding label inconsistency may be output by any method such as printing the information regarding label inconsistency on paper with a printing apparatus.

FIG. 4 is a diagram illustrating an example of the hardware configuration of the data labeling work support apparatus 1. The data labeling work support apparatus 1 is a computer, and includes, for example, a processor 201, a memory 202, an input device 203, a display device 204, a communication device 205, and a storage 206 as hardware. The processor 201, the memory 202, the input device 203, the display device 204, the communication device 205, and the storage 206 are connected to a bus 207.

The processor 201 is a processor that controls the overall operation of the data labeling work support apparatus 1. The processor 201 operates as the label acquisition unit 101, the data acquisition unit 102, the feature extraction unit 103, the labeling unit 104, the matching degree calculation unit 105, and the output control unit 106, for example, by executing a program stored in the storage 206. The processor 201 is, for example, a CPU. The processor 201 may be an MPU, a GPU, an ASIC, an FPGA, or the like. The processor 201 may be a single CPU or the like, or may be a plurality of CPUs or the like.

The memory 202 includes a ROM and a RAM. The ROM is a nonvolatile memory. The ROM stores a startup program and the like of the data labeling work support apparatus 1. The RAM is a volatile memory. The RAM is used as a working memory at the time of processing in the processor 201, for example.

The input device 203 is an input device such as a touch panel, a keyboard, or a mouse. In a case where the input device 203 is operated, a signal corresponding to the operation content is input to the processor 201 via the bus 207. The processor 201 performs various processing according to the signal.

The display device 204 is a display device such as a liquid crystal display or an organic EL display, and an output device for various types of information such as a printer.

The communication device 205 is a communication device for the data labeling work support apparatus 1 to communicate with an external apparatus. The communication device 205 may be a communication device for wired communication or a communication device for wireless communication.

The storage 206 is, for example, a storage such as a hard disk drive or a solid-state drive. The storage 206 stores various programs executed by the processor 201, e.g., a data labeling work support program 2061 and so on.

The storage 206 also stores an integrated label 2062 and a degree of matching 2063. The integrated label 2062 is data generated as a result of integration of an AI label and a manual label. The degree of matching 2063 is a degree of matching between the AI label and the manual label calculated from the integrated label 2062.

The bus 207 is a data transfer path for exchanging data between the processor 201, the memory 202, the input device 203, the display device 204, the communication device 205, and the storage 206.

Next, the operation of the data labeling work support apparatus 1 will be described. FIG. 5 is a flowchart depicting an operation of the data labeling work support apparatus 1. The processing of FIG. 5 is performed, for example, every time information on a manual label is input. In the following description, the manual label is assumed to be any one of the labels A, B, and C. Further, the AI label is assumed to be any one of the labels 1, 2, and 3 corresponding to the cluster number. Further, in the following description, it is assumed that the manual label is assigned by only one operator.

In step S1, the label acquisition unit 101 acquires a manual label. Further, the data acquisition unit 102 acquires actual data on an image to which the manual label acquired by the label acquisition unit 101 is assigned. The manual label and the actual data on the image are input in response to the user operating the input device 203, for example. Further, in a case where the manual label and the actual data on the image are recorded as one file, the manual label and the actual data on the image may be acquired by inputting the file. The manual label and the actual data on the image thus acquired is stored in, for example, the memory 202.

In step S2, the feature extraction unit 103 extracts the feature $X_i$ from the actual data on the image. The feature can be extracted, for example, by a method using the deep neural network described above.

In step S3, the labeling unit 104 assigns an AI label to the i-th image based on the feature $X_i$ extracted from the actual data on the i-th image. The labeling unit 104 calculates a similarity or a distance between the feature $X_i$ of the i-th image and features of the other images belonging to the individual groups. The labeling unit 104 then groups the i-th image based on the degree of the similarity of the features or the degree of the distance of the features. The labeling unit 104 then assigns an AI label to the i-th image depending on which group the i-th image is grouped into.

In step S4, the matching degree calculation unit 105 generates an integrated label by integrating the AI label and the manual label. The matching degree calculation unit 105 then calculates a degree of matching from the integrated label based on Formula (1). For example, in a case where the manual label is any one of the labels A, B, and C and the AI label is any one of the labels 1, 2, and 3, the matching degree calculation unit 105 calculates degrees of matching r(A, 1), r(A, 2), r(A, 3), r(B, 1), r(B, 2), r(B, 3), r(C, 1), r(C, 2), and r(C, 3). As described above, it is not necessary to calculate a degree of matching for a combination that does not exist.

In step S5, the output control unit 106 outputs information regarding label inconsistency. Thereafter, the processing of FIG. 5 ends.

For example, the output control unit 106 may display, using the feature, plot points with labels representing images on the display device 204. In this case, the output control unit 106 converts the feature of each image into a further lower-dimensional plot feature so that the feature of each image can be displayed as a plot point. For example, a k-dimensional feature $X_i$ extracted from the i-th image can be converted into a two-dimensional plot feature $X'_i = (x'_{i1}, x'_{i2})$. The conversion into the two-dimensional feature can be realized by a dimension reduction method using clustering by unsupervised learning such as t-distributed stochastic neighbor embedding (t-SNE) and uniform manifold approximation and projection (UMAP). Note that, in the methods such as t-SNE and UMAP, reduction to the number of dimensions other than two dimensions can also be performed. The number of dimensions of the plot feature may be any number of dimensions in which an image can be displayed as a plot point. The number of dimensions of the plot feature thus may be three dimensions, for example.

FIG. 6A is a diagram illustrating an example of a display screen for plot points with AI labels displayed based on two-dimensional plot features as an output screen for information regarding label inconsistency. Each plot point PA corresponds to one image. The display position of each plot point PA in the horizontal direction corresponds to, for example, a plot feature $x'_{i1}$, and the display position of each plot point PA in the vertical direction corresponds to, for example, a plot feature $x'_{i2}$. Any one of numbers 1, 2, and 3 representing the AI labels is displayed at each plot point PA. The user can watch the screen illustrated in FIG. 6A to check the distribution of the AI labels assigned by the labeling unit 104. Here, in a case where any one of the plot points PA illustrated in FIG. 6A is selected, a corresponding image may be displayed.

FIG. 6B is a diagram illustrating an example of a display screen for plot points with manual labels displayed based on two-dimensional plot features as an output screen for information regarding label inconsistency. The user operates his/her input device 203 to change the display screen of FIG. 6A to the display screen of FIG. 6B, for example.

Similarly to the plot points with AI labels, each plot point P11 corresponds to one image. The display position of each plot point P11 in the horizontal direction corresponds to, for example, the plot feature $x'_{i1}$, and the display position of each plot point P11 in the vertical direction corresponds to, for example, the plot feature $x'_{i2}$. Therefore, the plot point PA and the plot point P11 for the identical image are displayed at the same position on the screen of the display device 204. Any one of alphabetic characters A, B, and C representing the manual labels is displayed at each plot point P11. The user can watch the display screen illustrated in FIG. 6B to check the distribution of the manual labels assigned by an operator 1. Here, in a case where any one of the plot points P11 illustrated in FIG. 6B is selected, a corresponding image may be displayed.

Further, in the display of FIG. 6B, a plot point P12 having a low degree of matching with a plot point with an AI label, for example, a plot point P12 having a degree of matching of 0.5 or less is highlighted more than the other plot points. For example, in FIG. 6B, the plot point P12 is displayed as a line of a type different from those of the other plot points. The user can watch the display screen illustrated in FIG. 6B to easily identify an image in which label inconsistency possibly occurs. Here, highlighting is not necessarily limited to making the type of line different from that of the other plot points. For example, highlighting may be performed by making a color different from that of the other plot points, by making a shape different from that of the other plot points, or by making a size different from that of the other plot points.

Here, the display screen of FIG. 6A and the display screen of FIG. 6B are not limited to be configured to be switchable. For example, the display screen of FIG. 6A and the display screen of FIG. 6B may be arranged side by side on one screen.

The output of the information regarding label inconsistency is not limited to the two-dimensional display of the plot points. The information regarding label inconsistency may be output by displaying a list of combinations having a low degree of matching on the display device 204. Alternatively, the output may be an output that does not involve displaying such as printing.

As described above, according to the embodiment, the matching degree calculation unit 105 calculates a degree of matching between a first label that is assigned manually or the like and acquired by the label acquisition unit 101 and a second label that is assigned by the labeling unit 104 based on an image to which the first label is assigned. Then, the information regarding label inconsistency is output based on the degree of matching. This allows the user to notice label inconsistency without reviewing the actual image. In this way, according to the embodiment, a workload of checking labels by the user can be reduced.

Further, the labeling unit 104 assigns the second label to an image by an unsupervised learning method such as clustering, for example. That is, no person intervenes in the labeling by the labeling unit 104. Accordingly, for example, even in a case where an image is labelled at the time of starting a new product or inspection, there is little variation in determination to assign a label. Further, unlike a case where a label is manually assigned, labels are assigned without variation with knowledge of a new product or inspection unneeded, and the quality of the assigned labels is secured.

Hereinafter, modifications to the embodiment will be described.

First Modification: Automatic Setting of Number of Groups

In the embodiment described above, the number L' of groups of image data grouped by the labeling unit 104 is assumed to be the same as the number L of types of manual labels. Actually, the number L' of groups of image data may be equal to or larger than the number L of types of manual labels. The number L' of groups may be set to L'=L+K using preset K (K is an integer of 1 or more).

FIGS. 7A and 7B are diagrams for explaining an effect of setting the number of groups to be larger than L. FIG. 7A is a diagram illustrating an example of a display screen for plot points with AI labels displayed two-dimensionally in a first modification. On the other hand, FIG. 7B is a diagram illustrating an example of a display screen of plot points with manual labels displayed two-dimensionally in the first modification.

Here, in the first modification, L is 2. In this case, any one of the manual labels A and B is assigned to an image. On the other hand, in the first modification, K is 1, that is, L' is 3. Thus, any one of the AI labels 1, 2, and 3 is assigned to an image. That is, the number of types of AI labels is larger by one than the number of types of manual labels. In this case, different AI labels can be assigned to similar images. For example, as illustrated in FIG. 7A, an AI label 1 or 2 can be assigned to an image to which a manual label B is assigned in FIG. 7B. This means that the images to which the manual label B is assigned are further divided into two groups based on the feature.

Even in a case where the number of types of AI labels is larger by one than the number of types of manual labels, a degree of matching r(A, 1), r(A, 2), r(A, 3), r(B, 1), r(B, 2), and r(B, 3) can be calculated according to Formula (1). Then, plot points having a low degree of matching are highlighted as illustrated in FIG. 7B. Here, even if the images to which the manual label B is assigned are further divided into two groups, a degree of matching in each group can be accurately calculated. Therefore, as with a case where the number of types of manual labels is equal to the number of types of AI labels, an image in which label inconsistency occurs can be identified. Specifically, in the example of FIG.

7B, the degree of matching of the degrees of matching r(A, 1), r(A, 2), and r(B, 3) are low. The positions of the plot points having a low degree of matching are the same even in a case where the AI label 1 and the AI label 2 are assumed to be the same label.

As described above, in the first modification, the number of types of AI labels can be larger than the number of types of manual labels. The fact that the number of types of AI labels is large, that is, the fact that the number of groups is large means that labels more similar in feature are classified into the same group. As a result, improvement in accuracy of assignment of the AI label is expected. In practice, it is desirable to set L' suitable for highlighting label inconsistency in consideration of processing time and the like, that is, to set K.

Incidentally, it is not desirable that the number of types of AI labels is smaller than the number of types of manual labels. The reason is that groups to be divided cannot be divided and the AI labels are sometimes not assigned appropriately.

Second Modification: Check of Label Inconsistency of Proximity Data

In the embodiment described above, AI labels are assigned to all of the acquired images. Instead, an AI label may be assigned to an image similar to an image of interest to a user.

Figure 8:
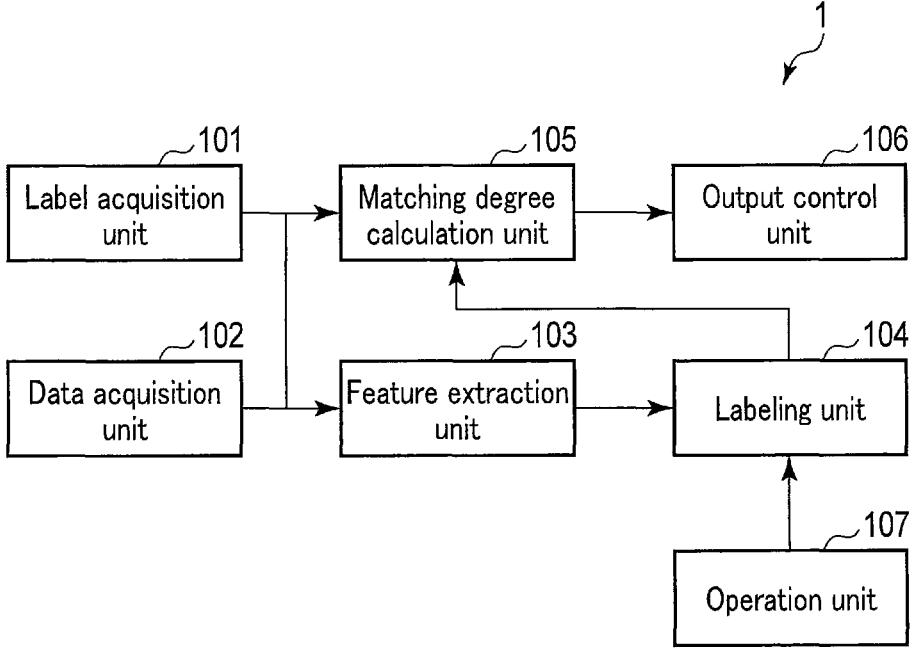
FIG. 8 is a block diagram illustrating the overall configuration of a data labeling work support apparatus according to a second modification.

FIG. 8 is a block diagram illustrating the overall configuration of a data labeling work support apparatus according to a second modification. A data labeling work support apparatus 1 according to the second modification includes an operation unit 107 in addition to a label acquisition unit 101, a data acquisition unit 102, a feature extraction unit 103, a labeling unit 104, a matching degree calculation unit 105, and an output control unit 106. The operation unit 107 receives an operation of selecting a plot point by the user on a screen displaying a plot point with a manual label. The operation unit 107 then inputs information for identifying the selected plot point, for example, coordinates of the plot point, to the labeling unit 104. The operation unit 107 can be configured by, for example, an input device 203.

In a case where a plot point is selected by the operation unit 107, the labeling unit 104 of the second modification uses a feature or a plot feature to assign a temporary AI label to an image corresponding to the selected plot point and P plot points in the vicinity of the selected plot point.

The matching degree calculation unit 105 of the second modification calculates a degree of matching between the image to which the temporary AI label is assigned and a manual label.

The output control unit 106 of the second modification highlights a plot point corresponding to an image having a low degree of matching among the images to which the temporary AI label is assigned.

Figure 9A:
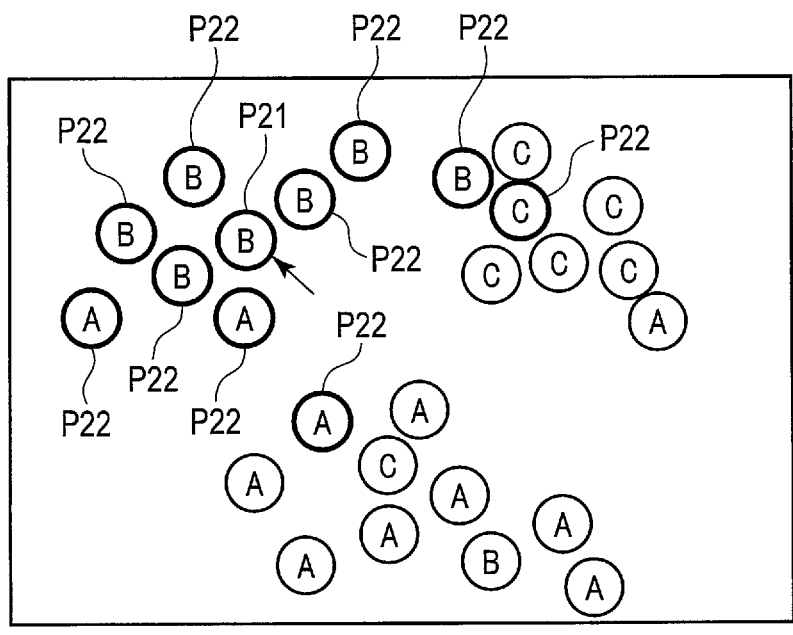
FIG. 9A is a diagram illustrating an example of a display screen for plot points with manual labels in the second modification.

The operation in the second modification will be specifically described. FIG. 9A is a diagram illustrating an example of a display screen for plot points with manual labels in the second modification. The display screen for the plot points with the manual labels can be displayed in the same manner as in the embodiment and the first modification described above. Here, it is assumed that the user selects a plot point P21. In response to the selection, the labeling unit 104 searches for an image having a feature similar to or close to a feature of an image for the plot point P21. For example, in a case where P is 10, the labeling unit 104 searches for 10 points near the plot point P21 indicated by points P22 in FIG. 9A. The P may be a fixed value or may be set by the user, for example.

Figure 9B:
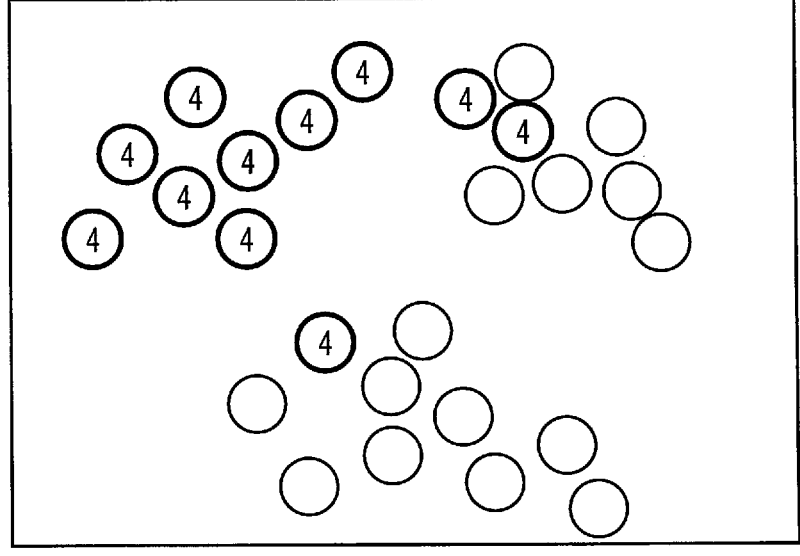
FIG. 9B is a diagram illustrating an example of a temporary AI label.

After searching for images, the labeling unit 104 assigns a temporary AI label to an image found out by the search. It is assumed that the labeling unit 104 has assigned the temporary AI label 4 as illustrated in FIG. 9B, for example.

The matching degree calculation unit 105 calculates a degree of matching of the manual labels with respect to the temporary AI label. The degree of matching between the manual labels illustrated in FIG. 9A and the temporary AI labels illustrated in FIG. 9B is illustrated in FIG. 9C.

As illustrated in FIG. 9D, the output control unit 106 highlights plot points P23 corresponding to images having a low degree of matching with respect to the temporary AI label.

In the second modification described above, by selecting an image of interest, the user can find an image having a possibility of label inconsistency among images similar to the image of interest without complicated work.

In the second modification, AI labels for images corresponding to plot points other than the plot point selected by the user and the plot points in the vicinity of the selected point may be assigned or may not be assigned. In a case where AI labels are assigned, the AI labels may be assigned by a method similar to that of the embodiment described above.

Third Modification: Check of Label Inconsistency of Same Type

In the second modification, in a case where a plot point with a manual label is selected, a temporary AI label is assigned to the selected plot point and a plot point in the vicinity of the selected point, a degree of matching between the temporary AI label and the manual label is calculated, and a plot point with a manual label having a low degree of matching with the temporary AI label is highlighted. Instead, another configuration is possible in which a plot point with a manual label selected by a user is regarded as a plot point where label inconsistency occurs and a plot point where label inconsistency similar to that in that plot point occurs is highlighted. A block diagram illustrating the overall configuration of a data labeling work support apparatus according to the third modification may be similar to that of the second modification.

In a case where an operation unit 107 selects a plot point, a matching degree calculation unit 105 in the third modification lists an image having the same combination of an AI label and a manual label as the combination of an AI label and a manual label in an image corresponding to the selected plot point.

An output control unit 106 outputs a list of the images listed by the matching degree calculation unit 105. Alternatively, the output control unit 106 highlights plot points with manual labels corresponding to the images listed by the matching degree calculation unit 105.

The operation in the third modification will be specifically described. FIG. 10A is a diagram illustrating an example of a display screen for plot points with manual labels in a third modification. The display screen for the plot points with the manual labels can be displayed in the same manner as in the embodiment and the first modification described above. It is assumed that the user selects a plot point P31. The plot point P31 is a plot point determined, by the user, that label inconsistency has occurred.

In response to the plot point P31 selected, the matching degree calculation unit 105 lists an image having the same combination of an AI label and a manual label as the combination of an AI label and a manual label with respect to an image corresponding to the plot point P31. For example, in a case where the plot point P31 corresponds to an image of number 1, the matching degree calculation unit 105 lists an image having the same combination as the combination of an AI label $y_{1A}$ and a manual label $y_{1j}$ correlated with the image of number 1. FIG. 10B is a diagram illustrating an example of listed images. For example, in a case where the AI label $y_{1A}$=1 is satisfied and the manual label $y_{1j}$=A is satisfied for the image of number 1, the matching degree calculation unit 105 lists an image having an AI label $y_{iA}$=1 and a manual label $y_{ij}$=A.

Figure 10C:
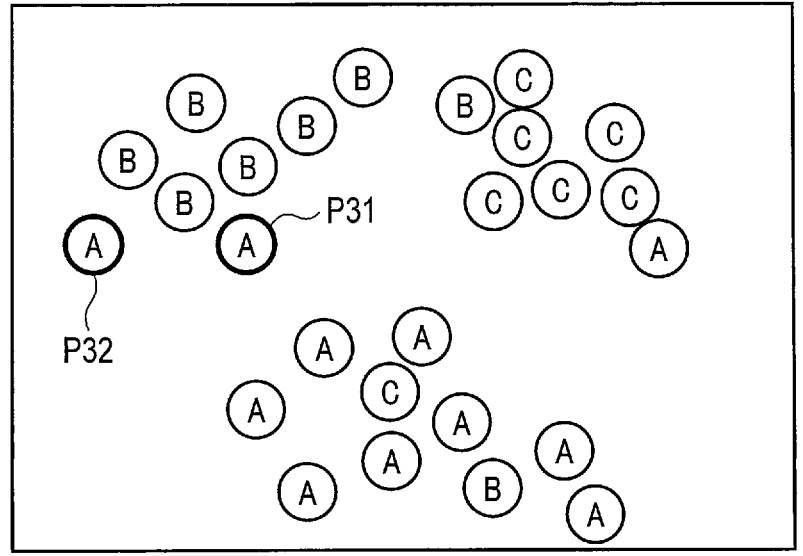
FIG. 10C is a diagram illustrating an example of highlighting plot points corresponding to images in which label inconsistency may occur in the same type as that in an image corresponding to a plot point selected by a user.

The output control unit 106 highlights, based on the result of listing by the matching degree calculation unit 105, plot points corresponding to images in which label inconsistence may occur in the same type as that in an image corresponding to a plot point selected by the user. For example, as illustrated in FIG. 10C, the output control unit 106 highlights a plot point P32 to which a manual label A is assigned and an AI label 1 is assigned, similarly to the plot point P31. The output control unit 106 may output the list of images illustrated in FIG. 10B.

In the third modification described above, the user can find an image having label inconsistency similar to label inconsistency of an image found by the user, without complicated work.

Fourth Modification: Case where Manual Labels are Assigned by a Plurality of Operators In the embodiment and the modifications, the description is provided of a case where a manual label is assigned by one operator. On the other hand, in a case where manual labels are assigned by two or more operators, for example, the manual labels assigned by the plurality of operators are integrated, so that processing similar to that of the embodiment and modifications described above is performed.

A matching degree calculation unit 105 according to the fourth modification creates a combined manual label by integrating the manual labels by the plurality of operators. For example, it is assumed that two operators assign manual labels to the i-th image. At this time, assuming that the manual label assigned by an operator j1 is $y_{ij1}$=$l_{ji}$ and the manual label assigned by an operator j2 is $y_{ij2}$=$l_{j2}$, a combined manual label $y_{ij1\_j2}$ is $i_{j1\_j2}$=$l_{j1}$_$l_{j2}$. FIG. 11 is a diagram illustrating an example of a combined manual label. In FIG. 11, manual labels by two operators, namely, an operator 1 and an operator 2 are obtained. As illustrated in FIG. 11, for example, in a case where the operator 1 assigns a manual label A and the operator 2 assign a manual label B, a combined manual label $y_{i1\_2}$ is A_B.

Further, the matching degree calculation unit 105 according to the fourth modification calculates a degree of matching of a combined manual label with respect to an AI label. The degree of matching may be calculated according to Formula (1). FIG. 12 is a diagram illustrating an example of a degree of matching. Similarly to the embodiment described above, the matching degree calculation unit 105 sorts combinations of AI labels and combined manual labels in ascending order of the degree of matching.

Here, the matching degree calculation unit 105 of the fourth modification may further calculate an agreement rate. The agreement rate is a ratio between the total number of operators and the number of operators who have assigned a manual label that is assigned most among the corresponding combined manual labels. For example, regarding the agreement rate for a combined manual label A_B, the total number of operators is two. Further, the manual labels assigned most are both the manual label A and the manual label B. The number of operators who have assigned the manual label A is one, and the number of operators who have assigned the manual label B is also one. Therefore, the agreement rate for the combined manual label A_B is ½.

An output control unit 106 outputs a list illustrated in FIG. 12. Alternatively, a plot point having a low degree of matching between an AI label and a combined manual label is highlighted. As a result, the user can find an image having a possibility of label inconsistency based on manual labels assigned by a plurality of operators, without complicated work. Further, an image having a low agreement rate and a low degree of matching is output to the top of the list, which allows the user to find an image assigned different manual labels by the operators.

Here, in the fourth modification, an example in which two operators assign manual labels is shown. The fourth modification can be applied even in a case where three or more operators assign manual labels.

The instruction shown in the processing procedure of the embodiments described above can be executed based on a program that is software. It is also possible that a general-purpose computer system stores this program in advance and reads the program to provide an effect similar to the effect of the data labeling work support apparatus described above. The instruction described in the embodiments is recorded, as a program executable by a computer, in a magnetic disk (flexible disk, hard disk, and the like), an optical disk (CD-ROM, CD-R, CD-RW, DVD-ROM, DVD±R, DVD±RW, Blu-ray (registered trademark) Disc, and the like), a semiconductor memory, or a recording medium similar thereto. As long as the recording medium is one readable by a computer or an embedded system, the storage format may be any form. In a case where the computer reads a program from the recording medium and causes an CPU to execute an instruction described in the program based on the program, an operation similar to that of the data labeling work support apparatus in the embodiments can be implemented. In a case where the computer acquires or reads a program, the program may be acquired or read through a network of course.

In addition, an operating system (OS), middleware (MW) such as database management software, a network running on a computer based on an instruction of a program installed from a recording medium to the computer or an embedded system may execute a part of each processing to realize the present embodiment.

Further, the recording medium in the present embodiment is not limited to a medium independent of a computer or an embedded system, and also includes a recording medium that downloads and stores or temporarily stores a program transmitted via a LAN, the Internet, or the like.

Further, the number of recording media is not limited to one, and a case where the processing in the present embodiment is executed from a plurality of media is also included in the recording media in the present embodiment, and the configuration of the media may be any configuration.

Note that the computer or the embedded system in the present embodiment is to execute each processing in the present embodiment based on a program stored in a recording medium, and may have any configuration such as a single apparatus, e.g., a personal computer, a microcomputer, or the like, a system in which a plurality of apparatuses is connected to a network, and the like.

In addition, the computer in the present embodiment is not limited to a personal computer, and includes an arithmetic processing apparatus, a microcomputer, and the like included in an information processing apparatus, and collectively refers to equipment and an apparatus capable of implementing, by a program, the functions in the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data labeling work support apparatus comprising:

a processor including hardware; and a memory configured to store instructions that, when executed by the processor, cause the processor to:

acquire training data including a plurality of data pieces;

acquire a plurality of first labels manually assigned to the data pieces of the training data, extract features of the data pieces of the training data by using a first unsupervised learning method without labels, group the data pieces of the training data based on a similarity or a distance of the features by using a second unsupervised learning method, assign a plurality of second labels to the grouped data pieces of the training data by using the second unsupervised learning method, calculate, for each of the data pieces, a degree of matching between the first label assigned to the data piece and the second label assigned to the data piece, display, on a screen of a display device, a plurality of plot points representing the training data using the features, each plot point corresponding to one data piece, and highlight a plot point representing a data piece of the training data corresponding to a combination of the first label and the second label having a low degree of matching.

2. The data labeling work support apparatus according to claim 1, wherein the number of groups to be grouped is set based on the number of types of the first labels.

3. The data labeling work support apparatus according to claim 1, wherein the processor receives a signal corresponding to an operation for selecting a plot point displayed on the screen, and assigns a plurality of third labels to a first data piece corresponding to the selected plot point and a plurality of second data pieces respectively corresponding to a plurality of plot points in a vicinity of the selected plot point, the processor calculates, for each of the first data piece and the second data pieces, a degree of matching between the first label assigned to the data piece and the third label assigned to the data piece, and the processor highlights a plot point representing a data piece among the first data piece and the second data pieces corresponding to a combination of the first label and the third label having a low degree of matching.

4. The data labeling work support apparatus according to claim 1, wherein the processor receives a signal corresponding to an operation for selecting the highlighted plot point displayed on the screen, the selected plot point corresponding to a first data piece, the processor lists a second data piece having a same combination of the first label and the second label as a combination of the first label and the second label assigned to the first data piece corresponding to the selected plot point, and the processor highlights a plot point corresponding to the listed second data piece.

5. The data labeling work support apparatus according to claim 1, wherein the processor acquires, for each of the data pieces, a plurality of first labels manually assigned by a plurality of persons, the processor generates, for each of the data pieces, a combined label in which the first labels assigned by the plurality of persons are combined, the processor calculates, for each of the data pieces, a degree of matching between the combined label and the second label, and the processor highlights a plot point representing a data piece corresponding to a combination of the combined label and the second label having a low degree of matching.

6. A data labeling work support method comprising:

acquiring training data including a plurality of data pieces;

acquiring a plurality of first labels manually assigned to the data pieces of the training data;

extracting features of the data pieces of the training data by using a first unsupervised learning method without labels;

grouping the data pieces of the training data based on a similarity or a distance of the features by using a second unsupervised learning method;

assigning a plurality of second labels to the grouped data pieces of the training data by using the second unsupervised learning method;

calculating, for each of the data pieces, a degree of matching between the first label assigned to the data piece and the second label assigned to the data piece;

displaying, on a screen of a display device, a plurality of plot points representing the training data using the features, each plot point corresponding to one data piece; and highlighting a plot point representing a data piece of the training data corresponding to a combination of the first label and the second label having a low degree of matching.

7. A non-transitory computer readable storage medium for storing a data labeling work support program for causing a computer to execute processing comprising:

acquiring training data including a plurality of data pieces;

acquiring a plurality of first labels manually assigned to the data pieces of the training data;

extracting a features of the data pieces of the training data by using a first unsupervised learning method without labels;

grouping the data pieces of the training data based on a similarity or a distance of the features by using a second unsupervised learning method;

assigning a plurality of second labels to the grouped data pieces of the training data by using the second unsupervised learning method;

calculating, for each of the data pieces, a degree of matching between the first label assigned to the data piece and the second label assigned to the data piece;

displaying, on a screen of a display device, a plurality of plot points representing the training data using the features, each plot point corresponding to one data piece; and highlighting a plot point representing a data piece of the training data corresponding to a combination of the first label and the second label having a low degree of matching.

\* \* \* \* \*